(12) United States Patent
Yamashita

(10) Patent No.: US 6,253,620 B1
(45) Date of Patent: Jul. 3, 2001

(54) DEVICE AND METHOD FOR MEASURING DYNAMIC TORSIONAL CHARACTERISTICS OF A DAMPER ASSEMBLY

(75) Inventor: Kazuhiro Yamashita, Hirakata (JP)

(73) Assignee: Exedy Corporation, Osaka (JP)

( * ) Notice: Subject to any disclaimer, the term of this patent is extended or adjusted under 35 U.S.C. 154(b) by 0 days.

(21) Appl. No.: 09/323,695

(22) Filed: Jun. 2, 1999

(30) Foreign Application Priority Data

Jun. 5, 1998 (JP) .................................... 10-157599

(51) Int. Cl.[7] ...................................................... G01D 9/00
(52) U.S. Cl. ................................................ 73/650; 73/847
(58) Field of Search ................................ 73/118.1, 847, 73/848, 650

(56) References Cited

U.S. PATENT DOCUMENTS

| 4,003,247 | * | 1/1977 | Moser et al. | 73/814 |
| 4,414,854 | * | 11/1983 | Haeg | 73/847 |
| 4,584,882 | * | 4/1986 | Tosaki | 73/847 |
| 4,667,787 | * | 5/1987 | Hofmann | 477/175 |
| 4,713,763 | * | 12/1987 | Hofmann | 701/103 |
| 5,711,407 |   | 1/1998 | Maier | 192/201 |

FOREIGN PATENT DOCUMENTS

| 3939695 | 5/1991 | (DE) . |
| 4222339 | 4/1994 | (DE) . |
| 19522225 | 1/1996 | (DE) . |
| 19817906 | 5/1999 | (DE) . |

* cited by examiner

*Primary Examiner*—Max Noori
(74) *Attorney, Agent, or Firm*—Shinjyu Global IP Counselors, LLP

(57) ABSTRACT

An object is to enable accurate measurement of dynamic torsional characteristics of a damper assembly.

A measuring device measures an angular speed ($d\theta_1/dt$) of an input rotary member, an angular speed ($d\theta_2/dt$) of an output rotary member and a torque ($T_1$) transmitted to the input rotary member. A torsion angle ($\theta$) of a damper unit is calculated by integrating the angular speeds ($d\theta_1/dt$) and ($d\theta_2/dt$) of the input and output rotary members. A torque (T) acting on the damper unit is calculated by subtracting a product of an angular acceleration ($d^2\theta_1/dt^2$) of the input rotary member calculated by differentiating the angular speed ($d\theta_1/dt$) of the input rotary member and a moment of inertia ($I_1$) of the input rotary member from the torque ($T_1$) transmitted to the input rotary member.

16 Claims, 8 Drawing Sheets

DEVICE AND METHOD FOR MEASURING DYNAMIC TORSIONAL CHARACTERISTICS OF A DAMPER ASSEMBLY

BACKGROUND OF THE INVENTION

A. Field of the Invention

The invention relates to a device and a method for measuring dynamic torsional characteristics of a damper assembly that includes a damper unit operably disposed between input and output rotary members.

B. Description of the Background Art

In the prior art, measurement of torsion characteristics of a damper assembly has been performed to obtain static torsion characteristics of the damper assembly by applying torsional vibrations while the damper assembly is maintained in a stationary state. However, the damper assembly is typically used in an automotive vehicle and rotates during operation receiving torsional vibrations in a high frequency range of tens of hertz or more. In view of the above, rotational torsion measuring devices are increasingly being employed for measuring the dynamic torsional characteristics of damper assemblies under conditions close to the actual service conditions.

Description is now given of a manner of measuring dynamic torsional characteristics of a damper assembly by a rotational torsion measuring device with reference to FIG. 6, where the damper assembly is statically retained.

A damper assembly 100 includes an input rotary member 101, an output rotary member 102 and a damper unit 103. The damper assembly 100 is fixed to first and second fixing portions 111 and 112 in a rotational torsion measuring device. More specifically, the input rotary member 101 is fixed to the first fixing portion 111, and the output rotary member 102 is fixed to the second fixing portion 112. The input rotary member 101 is fixed to the first fixing portion 111 via a shaft 113. After setting the damper assembly 100 in the rotational torsion measuring device as shown in FIG. 6, a vibrating (or fluctuating) torque, i.e., a torque for causing vibrations, is applied to the input rotary member 101 via the first fixing portion 111, and a torque Ts and a torsion angle θs are measured, as shown in FIG. 7.

According to the above rotational torsion measuring device, the torque Ts and torsion angle θs are measured within the measuring device as shown in FIG. 6. Therefore, the determined torsion characteristics include characteristics of the measuring device itself. A sensor cannot be attached directly to the damper assembly 100 in the above described configuration. Therefore, the torque Ts of the shaft 113 is measured by a sensor such as a strain gauge, and the torsion angle θs is determined by measuring the angular displacement between the first and second fixing portions 111 and 112. These measured values of the torque Ts and torsion angle θs do not provide complete or accurate indications of the actual damper torsion torque and damper torsion angle of the damper assembly 100 for many reasons, such as the reasons set forth below.

First, the torsion angle θs is a measurement of the difference in angular displacement between the first and second fixing portions 111 and 112. This measurement includes possible rotary displacement of elements other than the input and output rotary members 101 and 102. Further, the measured angular displacement includes displacement attributable to torque which results from inertia of the input rotary member 101 acting on the first fixing portion 111 that is measurable at the location of the sensor measuring the torque Ts. Therefore, the actual damper torsion torque of the damper assembly 100 may be smaller that the torque being measured. Accordingly, the torque applied to the input rotary member 101 increases in accordance with the inertia of the input rotary member 101 and increases variable angular acceleration thereof. Therefore, the torque Ts measured by the rotational torsion measuring device shown in FIG. 6 is smaller than the actual damper torsion torque of the damper assembly 100.

Since the conventional rotational torsion measuring device internally measures the torque and torsion angle as described above, the device cannot determine the torsion characteristics of the damper assembly itself, but can determine only the torsion characteristics containing vibration characteristics of the measuring device. In particular, when the vibrating inertia is large, the shaft has a low rigidity and/or the frequency of the vibrating torque is high, these facts significantly affect the result of measurement.

SUMMARY OF THE INVENTION

An object of the invention is to provide a measuring device and a measuring method for accurately measuring dynamic torsional characteristics of a damper assembly including a damper unit arranged between input and output rotary members.

In one aspect of the present invention, a measuring device is configured to measure dynamic torsional characteristics of a damper assembly that has a damper mechanism operably disposed between input and output rotary members of the damper assembly. The measuring device includes a vibrating means for supplying a vibrating torque to the input rotary member of the damper assembly and a first angular speed measuring sensor for measuring an angular speed ($d\theta_1/dt$) of the input rotary member. Further, a second angular speed measuring sensor measures an angular speed ($d\theta_2/dt$) of the output rotary member. A calculating means is configured to determine torque and angular displacement of the damper mechanism using measurements made by the first and second angular speed measuring sensors.

Preferably, the measuring device also includes a torque measuring sensor for measuring at least one of a torque ($T_1$) transmitted to the input rotary member and a torque ($T_2$) transmitted to the output rotary member. The calculating means includes: a first calculating unit for calculating a torsion angle (θ) of the damper unit; a second calculating unit for calculating a torque (T) acting on the damper unit; and a third calculating unit for calculating angular acceleration ($d^2\theta_1/dt^2$) of the input rotary member by differentiating the angular speed ($d\theta_1/dt$) of the input rotary member, calculations of the first and second calculating units being based on measurements from the first and second angular speed measuring sensors and the torque measuring sensor. The first calculating unit calculates the torsion angle (θ) of the damper unit by integrating a difference between the angular speed ($d\theta_1/dt$) of the input rotary member and the angular speed ($d\theta_2/dt$) of the output rotary member. The second calculating unit calculates the torque (T) acting on the damper unit by subtracting from the torque ($T_1$) the product of a moment of inertia ($I_1$) of the input rotary member and the angular acceleration ($d^2\theta_1/dt^2$) of the input rotary member, as set forth by the equation:

$$\{T=T_1-(I_1)\times(d^2\theta_1/dt^2)\}.$$

Preferably, the torque measuring sensor is a strain gauge fixed to a torsion shaft configured to support and apply torque to one of the input rotary member and the output rotary member of the damper unit.

Preferably, the torque measuring sensor is a magnetic pickup configured to sense motion of protrusions on an adjacent rotary member.

Alternatively, the measuring device further includes a torque measuring sensor for measuring at least one of a torque ($T_1$) transmitted to the input rotary member and a torque ($T_2$) transmitted to the output rotary member. The calculating means includes: a first calculating unit for calculating a torsion angle ($\theta$) of the damper unit; a second calculating unit for calculating a torque (T) acting on the damper unit; and a third calculating unit for calculating angular acceleration ($d^2\theta_1/dt^2$) of the input rotary member by differentiating the angular speed ($d\theta_1/dt$) of the input rotary member. Calculations of the first and second calculating units are based on measurements from the first and second angular speed measuring sensors and the torque measuring sensor. The first calculating unit calculates the torsion angle ($\theta$) of the damper unit by integrating a difference between the angular speed ($d\theta_1/dt$) of the input rotary member and the angular speed ($d\theta_2/dt$) of the output rotary member. The second calculating unit calculates the torque (T) acting on the damper unit by subtracting from the torque ($T_2$) the product of a moment of inertia ($I_2$) of the input rotary member and the angular acceleration ($d^2\theta_2/dt^2$) of the input rotary member, as set forth by the equation:

$$\{T=T_2+(I_2)\times(d^2\theta_2/dt^2)\}.$$

Preferably, the torque measuring sensor is a strain gauge fixed to a torsion shaft configured to support and apply torque to one of the input rotary member and the output rotary member of the damper unit.

Preferably, the torque measuring sensor is a magnetic pickup configured to sense motion of protrusions on an adjacent rotary member.

Preferably, the measuring device is adapted to measure dynamic torsional characteristics of the damper unit with the output rotary member of the damper unit restrained against rotary movement.

In another aspect of the present invention, a measuring device measures dynamic torsional characteristics of a damper assembly having a damper mechanism operably disposed between input and output rotary members. The measuring device includes a vibrating means for supplying a vibrating torque to the input rotary member, a first angular speed measuring sensor for measuring an angular speed ($d\theta_1/dt$) of the input rotary member, and a second angular speed measuring sensor for measuring an angular speed ($d\theta_2/dt$) of the output rotary member. A torque measuring sensor measures at least one of a torque ($T_1$) transmitted to the input rotary member and a torque ($T_2$) transmitted to the output rotary member. A calculating means has first and second calculating units for calculating at least a torsion angle ($\theta$) of the damper unit and a torque (T) acting on the damper unit based on measured values of the first and second angular speed measuring sensor and the torque measuring sensor. The first calculating unit of the calculating means calculates the torsion angle ($\theta$) of the damper unit by integrating a difference between the angular speed ($d\theta_1/dt$) of the input rotary member and the angular speed ($d\theta_2/dt$) of the output rotary member. The second calculating unit of the calculating means calculates the torque (T) acting on the damper unit by subtracting from the torque ($T_1$) a moment of inertia ($I_1$) of the input rotary member multiplied by an angular acceleration ($d^2\theta_1/dt^2$) of the input rotary member. The angular acceleration is calculated by differentiating the angular speed ($d\theta_1/dt$) of the input rotary member, where the torque measuring sensor measures the torque ($T_1$) transmitted to the input rotary member, according to the equation:

$$\{T=T_1-(I_1)\times(d^2\theta_1/dt^2)\}.$$

The torque (T) acting on the damper unit is calculated by adding to the torque ($T_2$) transmitted to the output rotary member a moment of inertia ($I_2$) of the output rotary member multiplied by an angular acceleration ($d^2\theta_2/dt^2$) of the output rotary member, the angular acceleration being calculated by differentiating the angular speed ($d\theta_2/dt$) of the output rotary member, where the torque measuring A sensor measures the torque ($T_2$) transmitted to the output rotary member in accordance with the equation:

$$\{T=T_2+(I_2)\times(d^2\theta_2/dt^2)\}.$$

Preferably, the measuring device is adapted to measure dynamic torsional characteristics of the damper unit with the output rotary member restrained against rotary movement.

By the above described configurations, the angular speed and angular acceleration of the input or output rotary member are measured and calculated, respectively, and the product of the angular acceleration and the moment of inertia is subtract from or added to the torque transmitted to the input or output rotary member. Therefore, it is possible to remove any influence of the inertia of the input or output rotary member from the torque measured by the torque measuring sensor, and the torque (T) acting on the damper assembly can be precisely determined.

In the above structure, the angular speeds (d/dt) and (d/dt) of the input and output rotary members are measured, and the torsion angle ($\theta$) of the damper unit is calculated by integrating the difference between these angular speeds. Therefore, it is possible to determine the actual torsion angle ($\theta$) of the damper assembly, which does not include torsion angles between respective ones of the input/output rotary members and attached restraining portions of the measuring device that restrain the input/output rotary members.

As described above, the torque (T) acting on the damper assembly and the torsion angle ($\theta$) of the damper assembly can be determined more accurately than the prior art. Therefore, the dynamic torsional characteristics of the damper assembly can be determined accurately. In particular, the dynamic torsional characteristics can be accurately determined even from the damper assembly, in which the vibrating inertia of the input and output rotary members is large, and therefore a large error would occur if measured by a conventional measuring device.

In accordance with yet another aspect of the present invention, a measuring device measures dynamic torsional characteristics of a damper assembly that includes a damper unit arranged between input and output rotary members, the measuring device adapted to measure while restraining movement of the input rotary member. The measuring device includes vibrating means for supplying a vibrating torque to the input rotary member, a first angular speed measuring sensor for measuring an angular speed ($d\theta_1/dt$) of the input rotary member, and a second angular speed measuring sensor for measuring an angular speed ($d\theta_2/dt$) of the output rotary member. A calculating means has first and second calculating units for calculating at least a torsion angle ($\theta$) of the damper unit and a torque (T) acting on the damper unit based on measured values of the first and second angular speed measuring sensor. The first calculating unit of the calculating means calculates the torsion angle ($\theta$) of the damper unit by integrating a difference between the angular speed ($d\theta_1/dt$) of the input rotary member and the angular speed ($d\theta_2/dt$) of the output rotary member. The second calculating unit of the calculating means calculates the torque (T) acting on the damper unit by multiplying an angular acceleration ($d^2\theta_2/dt^2$) of the output rotary member by a moment of inertia ($I_2$) of the output rotary member according to the equation:

$$\{T=(I_2)\times(d^2\theta_2/dt^2)\}.$$

The angular acceleration is calculated by differentiating the angular speed ($d\theta_2/dt$) of the output rotary member.

Preferably, the torque measuring sensor includes a strain gauge fixed to a torsion shaft configured to support and apply torque to one of the input rotary member and the output rotary member of the damper unit.

Preferably, the torque measuring sensor includes a magnetic pickup configured to sense motion of protrusions on an adjacent rotary member.

According to the above structure, the dynamic torsional characteristics of the damper assembly are measured by the measuring device which restrains the input rotary member and does not restrain the output rotary member. Since the output rotary member ss not restrained, the torque (T) acting on the damper assembly can be calculated by measuring and calculating the angular speed and angular acceleration of the output rotary member, respectively, and multiplying the same by the moment of inertia of the output rotary member. In this configuration, the moment of inertia of the output rotary member is measured in advance, and the angular acceleration of the output rotary member is measured and calculated, whereby the torque (T) acting on the damper assembly can be determined.

In this structure, the angular speeds (d/dt) and (d/dt) of the input and output rotary members are measured, and the torsion angle ($\theta$) of the damper unit is calculated by integrating the difference between these angular speeds. Therefore, it is possible to determine the actual torsion angle ($\theta$) of the damper assembly, which does not contain the torsion angle between the input rotary member and a restraining portion of the measuring device restraining the input rotary member.

As described above, the device can measure the dynamic torsional characteristics of the damper assembly without restraining the output rotary member.

In accordance with another aspect of the present invention, there is a method for measuring dynamic torsional characteristics of a damper assembly including a damper unit arranged between input and output rotary members. The method includes the steps of:

providing a vibrating torque to the input rotary member;

measuring angular speed ($d\theta_1/dt$) of the input rotary member;

measuring angular speed ($d\theta_2/dt$) of the output rotary member;

measuring at least one of a torque ($T_1$) transmitted to the input rotary member and a torque ($T_2$) transmitted to the output rotary member;

calculating the torsion angle ($\theta$) of the damper unit by integrating a difference between the angular speed ($d\theta_1/dt$) of the input rotary member and the angular speed ($d\theta_2/dt$) of the output rotary member; and calculating step of calculating the torque (T) acting on the damper unit by at least one of two methods, the first method being: subtracting from the torque ($T_1$) a moment of inertia ($I_1$) of the input rotary member multiplied by an angular acceleration ($d^2\theta_1/dt^2$) of the input rotary member according to the equation:

$$\{T=T_1-(I_1)\times(d^2\theta_1/dt^2)\}$$

the angular acceleration being calculated by differentiating the angular speed ($d\theta_1/dt$) of the input rotary member in response to measuring the torque ($T_1$) being measured in the torque measuring step, and the second method being: adding to the torque ($T_2$) a moment of inertia ($I_2$) of the output rotary member multiplied by an angular acceleration ($d^2\theta_2/dt^2$) of the output rotary member according to the equation:

$$\{T=T_2+(I_2)\times(d^2\theta_2/dt^2)\}$$

the angular acceleration being calculated by differentiating the angular speed ($d\theta_2/dt$) of the output rotary member, in response to measuring the torque ($T_2$).

In the measuring method of the above aspect of the invention, the angular speed and angular acceleration of the input or output rotary member are measured and calculated, respectively, and the product of the angular acceleration and the moment of inertia is subtract from or added to the torque transmitted to the input or output rotary member. Therefore, it is possible to remove an influence of the inertial of the input or output rotary member from the torque measured in the torque measuring step, and the torque (T) acting on the damper assembly can be precisely determined.

In the above measuring method, the angular speeds (d/dt) and (d/dt) of the input and output rotary members are measured, and the torsion angle ($\theta$) of the damper unit is calculated by integrating the difference between these angular speeds. Therefore, it is possible to determine the actual torsion angle ($\theta$) of the damper assembly, which does not include torsion angles between the input/output rotary members and restraining portions of a measuring device restraining the input/output rotary members.

As described above, the torque (T) acting on the damper assembly and the torsion angle ($\theta$) of the damper assembly can be determined more accurately than the prior art. Therefore, the dynamic torsional characteristics of the damper assembly can be determined accurately. In particular, the dynamic torsional characteristics can be accurately determined even from the damper assembly, in which the vibrating inertia of the input and output rotary members is large, and therefore a large error would occur if measured by a conventional measuring device.

In accordance with still another aspect of the present invention, there is a method for measuring dynamic torsional characteristics of a damper assembly including a damper unit arranged between input and output rotary members, the method including the steps of:

providing a vibrating torque to the input rotary member;

measuring angular speed ($d\theta_1/dt$) of the input rotary member;

measuring angular speed ($d\theta_2/dt$) of the output rotary member;

calculating torsion angle ($\theta$) of the damper unit by integrating a difference between the angular speed ($d\theta_1/dt$) of the input rotary member and the angular speed ($d\theta_2/dt$) of the output rotary member; and calculating torque (T) acting on the damper unit by by multiplying an angular acceleration ($d^2\theta_2/dt^2$) of the output rotary member by a moment of inertia ($I_2$) of the output rotary member according to the equation:

$$\{T=(I_2)\times(d^2\theta_2/dt^2)\}$$

the angular acceleration being calculated by differentiating the angular speed ($d\theta_2/dt$) of the output rotary member.

According to the above measuring method, the dynamic torsional characteristics of the damper assembly are measured by a measuring device which restrains the input rotary member and does not restrain the output rotary member. Since the measuring device does not restrain the output rotary member, the torque (T) acting on the damper assembly can be calculated by measuring and calculating the angular speed and angular acceleration of the output rotary member, respectively, and multiplying the same by the moment of inertia of the output rotary member. In this method, the moment of inertia of the output rotary member is measured in advance, and the angular acceleration of the output rotary member is measured and calculated, whereby the torque (T) acting on the damper assembly can be determined.

In this measuring method, the angular speeds ($d\theta_1/dt$) and ($d\theta_2/dt$) of the input and output rotary members are measured, and the torsion angle ($\theta$) of the damper unit is calculated by integrating the difference between these angular speeds. Therefore, it is possible to determine the actual torsion angle ($\theta$) of the damper assembly, which does not contain the torsion angle between the input rotary member and a restraining portion of the measuring device restraining the input rotary member.

In the measuring method of the above aspect, the dynamic torsional characteristics of the damper assembly can be measured without restraining the output rotary member as described above. Accordingly, it is possible to measure the dynamic torsional characteristics of the damper assembly having one end which can be freely vibrated, in contrast to a conventional measuring method.

These and other objects, features, aspects and advantages of the present invention will become more fully apparent from the following detailed description of the present invention when taken in conjunction with the accompanying drawings where like reference numerals denote corresponding parts throughout.

DESCRIPTION OF THE PREFERRED EMBODIMENTS

First Embodiment

Figure 1A:
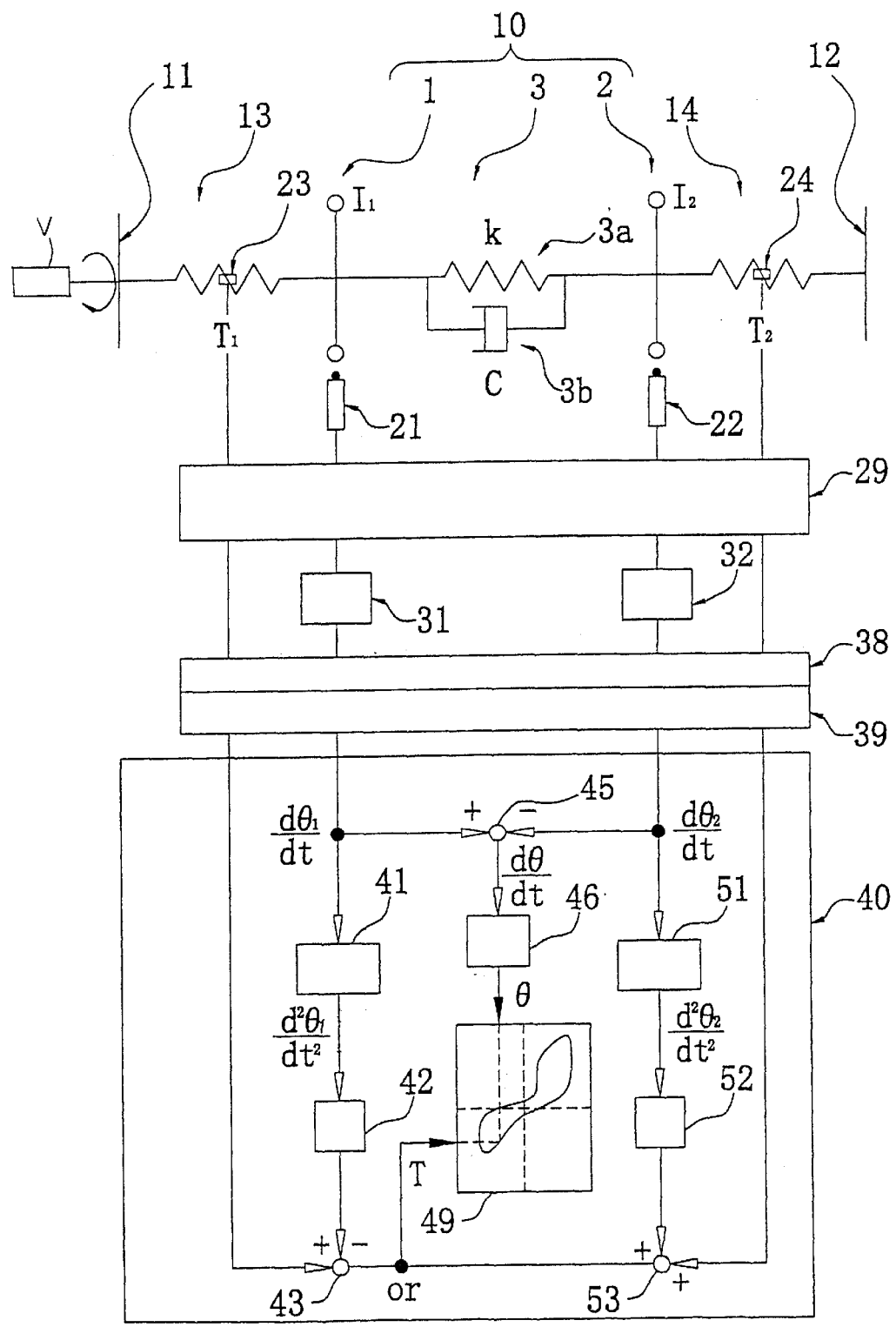
FIG. 1A is a schematic diagram showing a damper mechanism and a dynamic torsional characteristic measuring device in accordance with one embodiment of the present invention.

FIG. 1A schematically depicts a dynamic torsional characteristic measuring device and a rotary damper assembly 10 in accordance with an embodiment of the invention. The dynamic torsional characteristic measuring device is configured to measure torsion characteristics of the rotary damper assembly 10.

The dynamic torsional characteristic measuring device includes first and second fixing portions 11 and 12 and first and second shafts 13 and 14 coupling the rotary damper assembly 10 to the first and second fixing portions 11 and 12, respectively. The first and second fixing portions 11 and 12, first and second shafts 13 and 14 support the rotary damper assembly 10 during a torsion characteristic measuring process. The dynamic torsional characteristic measuring device also includes first and second pickups 21 and 22 for measuring speed of the outer periphery of the rotary damper assembly 10, first and second gauges 23 and 24 for measuring torque of the first and second shafts 13 and 14, respectively, and a data analyzing system. The first and second gauges 23 and 24 are sensors for measuring torque.

The data analyzing system analyzes data received from the first and second pickups 21 and 22 as well as data received from the first and second gauges 23 and 24, and derives the dynamic torsional characteristics of the rotary damper assembly 10 in a manner described in greater detail below. The data analyzing system is formed of a data recorder 29, rotation speed converters 31 and 32, a digital converter 38, a memory recorder 39 and a computer 40.

The rotary damper assembly 10 includes an input rotary member 1, an output rotary member 2 and a damper unit 3 therebetween, all positioned in the dynamic torsional characteristic measuring device as shown in FIG. 1A. The damper unit 3 includes, for instance, an elastic portion 3a, such as a coil spring or other spring-like element or mechanism, and a hysteresis damping portion 3b, such as friction surfaces or a viscous fluid dampening mechanism. The elastic portion 3a typically exhibits response characteristic k which may be, for instance, a linear response such as that exhibited by a coil spring. The hysteresis damping portion 3b exhibits response characteristic C which may be a non-linear response, such as is exhibited by two contacting friction surfaces which retard movement of a compressed coil spring as it returns to a non-compressed state.

The input rotary member 1 is fixed to the first fixing portion 11 via the first shaft 13, and the output rotary member 2 is fixed to the second fixing portion 12 via the second shaft 14. A moment of inertia $I_1$ of the input rotary member 1 and a moment of inertia $I_2$ of the output rotary member 2 are measured or calculated in advance, and are stored in memory (not shown) the computer 40. The rotary damper assembly 10 is used in a clutch device coupling an engine of, e.g., an engine to a transmission.

Figure 2:
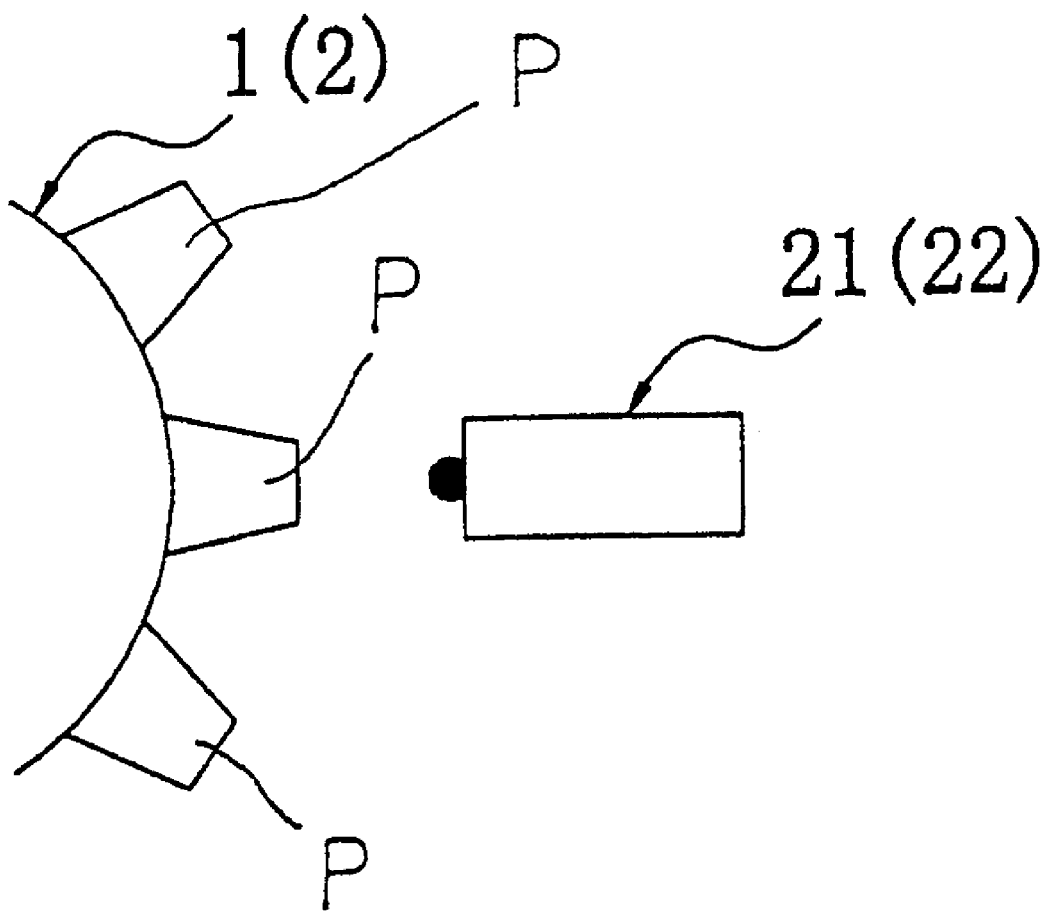
FIG. 2 is a fragmentary end view of an input member (and an output member) with a pickup of the dynamic torsional characteristic measuring device depicted in FIG. 1A.

As is shown in FIG. 2, the input rotary member 1 (and the output rotary member 2) include a plurality of radially outwardly extending protrusions P. The first (and second pickup 21 (and 22) are, for instance, magnetic pickups that sense changes in magnetic field due to the proximity of the protrusions P thereby producing an output signal. The first pickup 21 measures the speed of the outer periphery of the input rotary member 1, and the second pickup 22 measures a speed of the outer periphery of the output rotary member 2 by detecting movement of the protrusions past each pickup 21 and 22.

Figure 3:
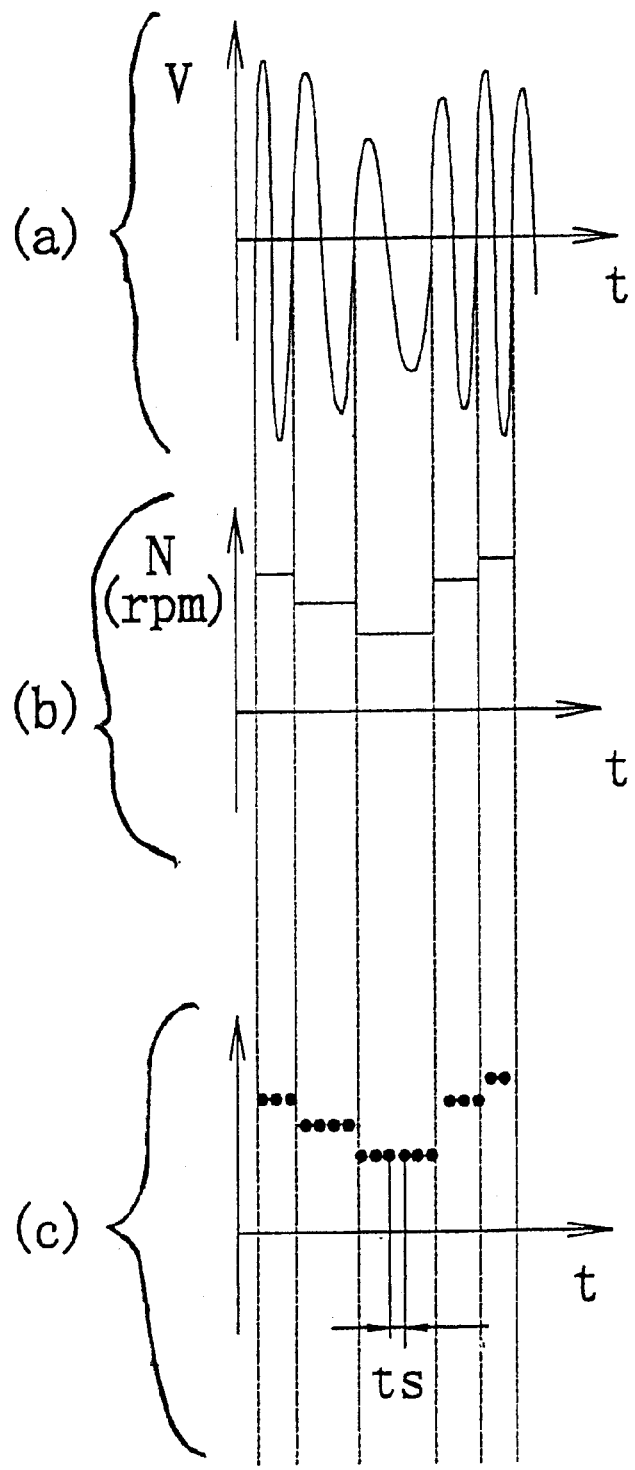
FIG. 3 is a diagram showing conversion of data by the dynamic torsional characteristic measuring device.

Each of the pickups 21 and 22 is a magnet type sensor. The first and second pickups 21 and 22 detect pulses, which are produced by rotation of a plurality of protrusions P on the outer peripheral surfaces of the input and output rotary members 1 and 2, respectively, and thereby transmit the results of detection to the data recorder 29. A signal transmitted from the first and second pickups 21 and 22 representing speed data is indicated at portion (a) in FIG. 3.

The first and second gauges 23 and 24 are, for example, strain gauges adhered to the first and second shafts 13 and 14 having predetermined rigidities, respectively. Specifically, the first and second shafts 13 and 14 are made of a material having a predetermined diameter such that detectable elastic deformation of each shaft can occur under the torsion and stress conditions necessary to test a damper assembly. Deformation of each shaft 13 and 14 is transmittable to the first and second gauges 23 and 24 such that the first and second gauges 23 and 24 also experience the deformation. Measurement of the deformation of the strain gauges, such as the gauges 23 and 24, is a measurable quantity, as is well known in mechanical arts. The deformation of the strain gauges is indicative of torque being applied to the shafts 13 and 14.

The first and second pickups 21 and 22 and the first and second gauges 23 and 24 are connected to the data recorder 29. The data recorder 29 is configured to record and store the speed data received from the first and second pickups 21 and 22 and torque data ($T_1$) and ($T_2$) received from the first and second gauges 23 and 24 that is produced within a predetermined time period of a test of the damper assembly 10.

The rotation speed converters 31 and 32 are connected to the data recorder 29 and are configured to convert the speed data received from the first and second pickups 21 and 22 into a signal representing rotation speed data of the input and output rotary members 1 and 2, respectively, and transmit the rotation speed data to the digital converter 38. Specifically, the rotation speed convertors 31 and 32 change the speed data shown in portion (a) in FIG. 3 into the rotation speed data shown in portion (b) of FIG. 3.

The rotational speed convertors 31 and 32 are connected to a digital converter 38, which converts analog data into digital data. In the present invention, the digital converter 38 converts the analog rotation speed data shown in portion (b) of FIG. 3 into digital data shown in portion (c) of FIG. 3. In portion (c) of FIG. 3, "ts" represents a sampling time of the analog to digital conversion.

The first and second gauges 23 and 24 are also connected to the digital convertor 38 such that the signals received therefrom are likewise converted from analog to digital signals.

The memory recorder 39 stores all the digital data converted by the digital converter 38.

The digital convertor 38 is further connected to the computer 40 such that all of the digital speed data that was converted from signals transmitted from the first and second pickups 21 and 22, and all of the digital data that was converted from signals transmitted from the first and second gauges 23 and 24 is received by circuits of the computer 40 for processing in a manner described below.

The computer 40 has a plurality of calculating units 41, 42, 43, 45, 46, 51, 52 and 53, which issue dynamic torsional characteristics 49 as a result of calculation. The calculating units 41, 42, 43, 45, 46, 51, 52 and 53 may be any of a variety of calculating means in the computer 40. For instance, the calculating units may be in the form of a computer program written to process inputs into the computer 40. The calculating units could alternatively be specific electronic circuits specifically manufactured to calculate in the manner described below. As well, the calculating units may also each be in the form of a computer chip with specific circuitry formed therein to perform the required calculations.

An angular speed ($d\theta_1/dt$) of the input rotary member 1 obtained from the first pickup 21, and converted into a digital signal by the digital converter 38 is fed to the calculating unit 41. The calculating unit is configured to differentiate the angular speed ($d\theta_1/dt$) and thereby calculate angular acceleration ($d^2\theta_1/dt^2$) of the input rotary member 1. Likewise, the calculating unit 51 differentiates an angular speed ($d\theta_2/dt$) of the output rotary member 2 obtained from the second pickup 22 and converted into digital signals by the digital convertor 38 to thereby calculate angular acceleration ($d^2\theta_2/dt^2$) of the output rotary member 2.

The calculating unit 42 multiplies the angular acceleration ($d^2\theta_1/dt^2$) of the input rotary member 1 by the moment of inertia ($I_1$) of the input rotary member 1, and the calculating unit 43 subtracts the product thus obtained from the measured torque ($T_1$) of the first shaft 13. In this manner, the calculating units 42 and 43 calculate the torque (T) of the rotary damper assembly 10 from the following formula:

$$T = T_1 - (I_1) \times (d^2\theta_1/dt^2).$$

Likewise, the calculating unit 52 multiplies the angular acceleration ($d^2\theta_2/dt^2$) of the output rotary member 2 by the moment of inertia ($I_2$) of the output rotary member 2, and the calculating unit 53 adds the product thus obtained to the measured torque ($T_2$) of the second shaft 14. In this manner, the calculating units 52 and 53 calculate the torque (T) of the rotary damper assembly 10 from the following formula:

$$T = T_2 + (I_2) \times (d^2\theta_2/dt^2).$$

Since the torque ($T_1$ and $T_2$) of the two shafts 13 and 14 is measured, the torque (T) of the rotary damper assembly 10 can be calculated through the two routes, i.e., the route including the calculating units 41, 42 and 43, and the route including the calculating units 51, 52 and 53. Further, the torque (T) can be calculated through only one of the routes if the torque of only one of the first and second shafts 13 and 14 is measured. The formula for calculating the torque (T) can be derived from the following two equations:

$$(I_1) \times (d^2\theta_1/dt^2) = T_1 - k(\theta_1 - \theta_2) - C\{(d\theta_1/dt) - (d\theta_2/dt)\}$$

$$(I_2) \times (d^2\theta_1/dt^2) = k(\theta_1 - \theta_2) + C\{(d\theta_1/dt) - (d\theta_2/dt)\} - T_2.$$

The angular speed ($d\theta_1/dt$) of the input rotary member 1 and the angular speed ($d\theta_2/dt$) are transmitted to the an calculating unit 45. Since both angular speeds are received, the calculating unit 45 produces a difference between the angular speed ($d\theta_1/dt$) of the input rotary member 1 and the angular speed ($d\theta_2/dt$) of the output rotary member 2. The calculating unit 46 integrates the difference thus obtained. Thereby, the relative torsion angle ($\theta$) of the rotary damper assembly 10 between the input and output rotary members 1 and 2 is calculated and supplied to a visual output such as a computer display or a printer. The calculated torque T is also supplied to the visual output to produce a graph of dynamic torsional characteristics 49.

Figure 4:
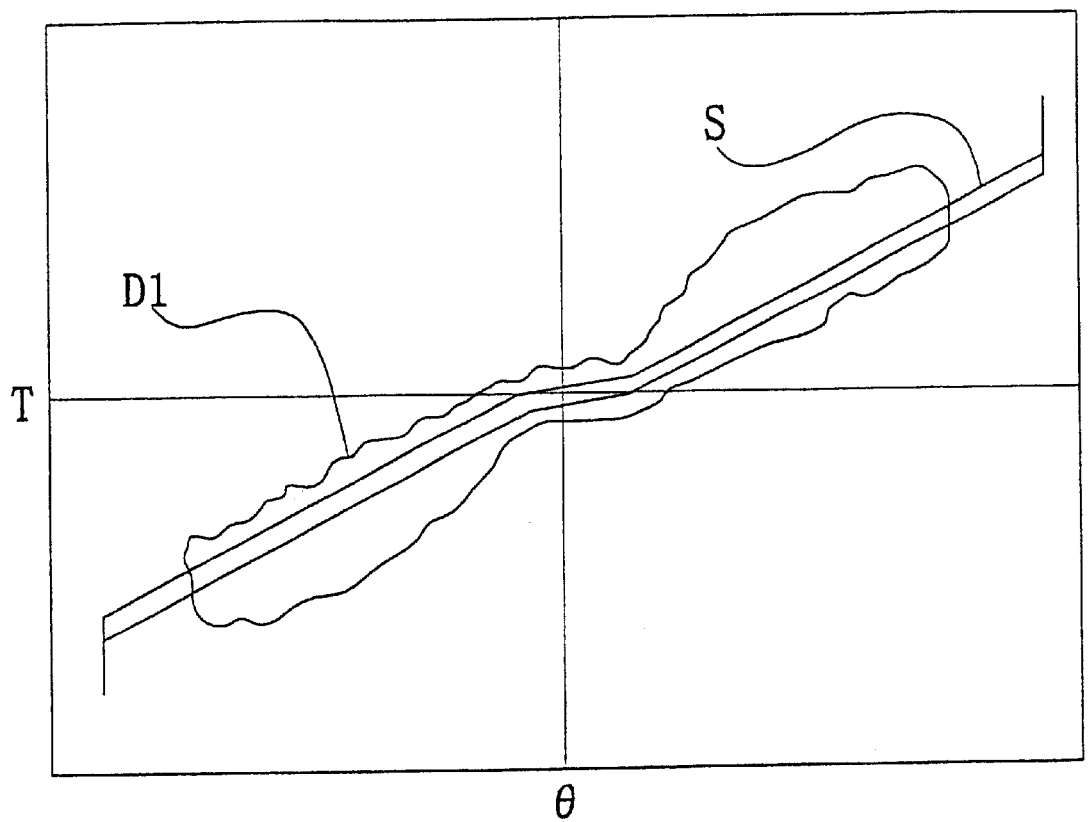
FIG. 4 is a graph showing dynamic torsional characteristics generated from the data converted by the dynamic torsional characteristic measuring device.

The dynamic torsional characteristics 49 of the rotary damper assembly 10 are obtained by graphing the torsion angle ($\theta$) relative to the calculated the torque (T) of the rotary damper assembly 10. An example of the dynamic torsional characteristics is shown in FIG. 4.

Figure 6:
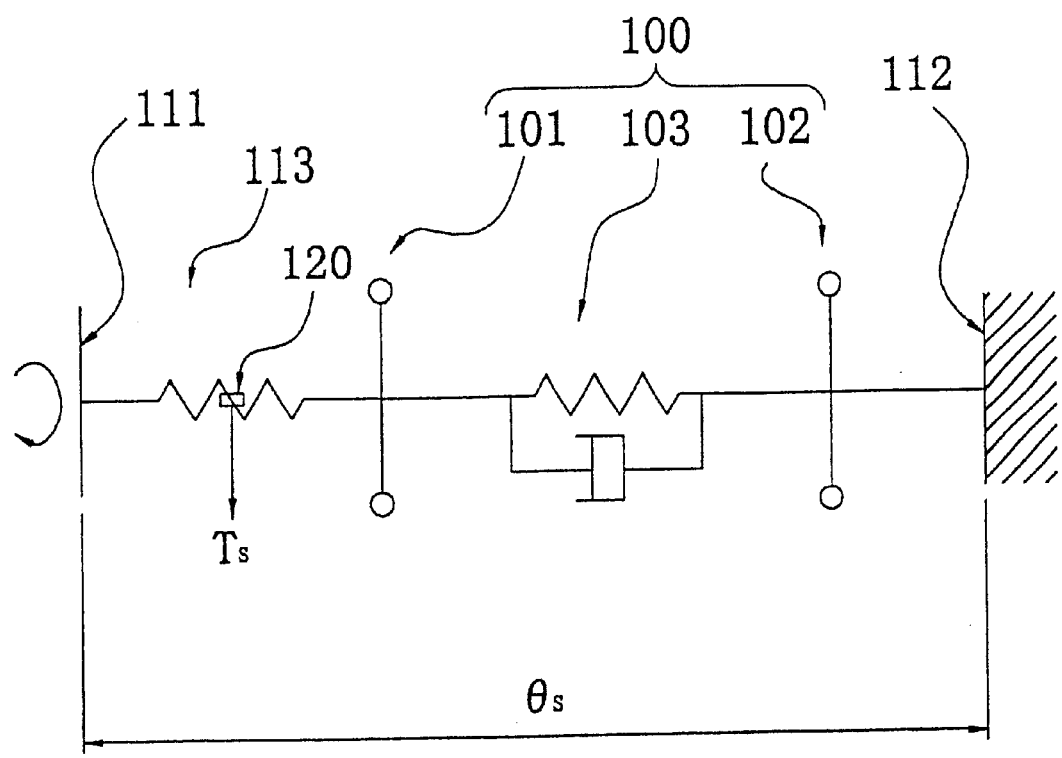
FIG. 6 is a schematic diagram showing a damper assembly restrained in a prior art dynamic torsional characteristic measuring device.
Figure 7:
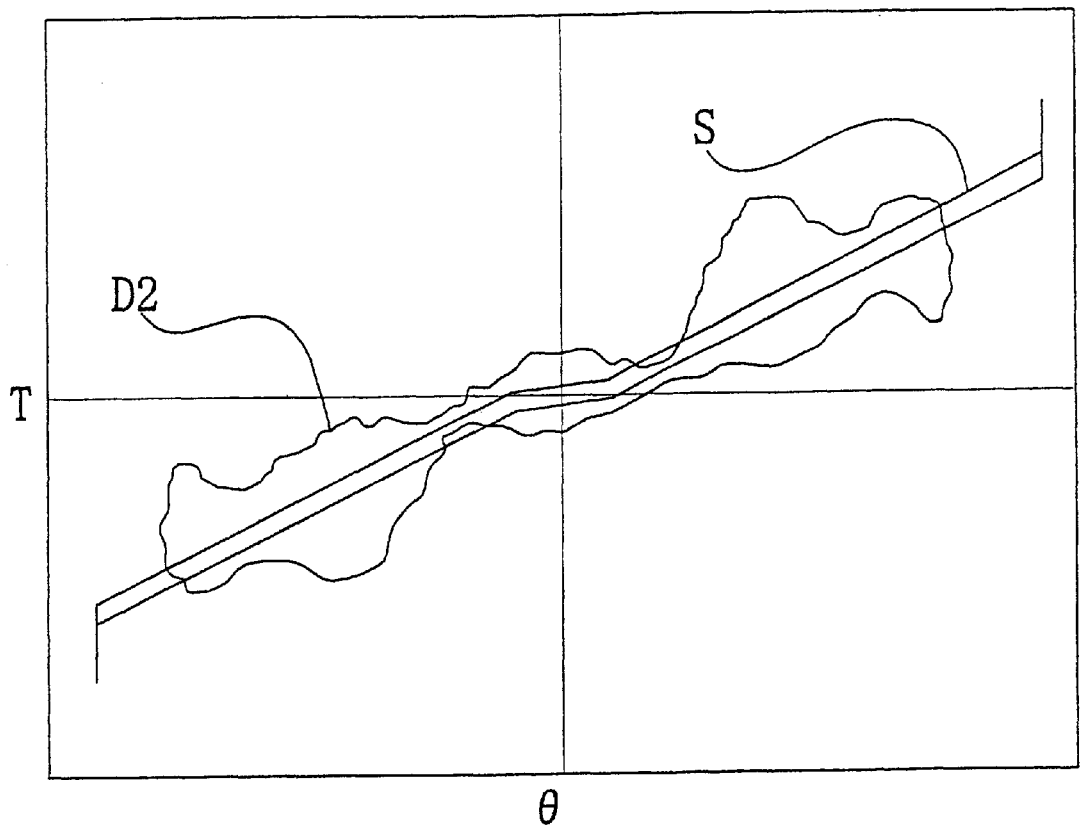
FIG. 7 is a graph indicating dynamic torsional characteristics measured by the conventional dynamic torsional characteristic measuring device depicted in FIG. 6.

In dynamic torsional characteristics shown in FIG. 7, which are obtained by a conventional method and disadvantageously contain characteristics of the measuring device, the indicated dynamic torsional characteristics D2 include irregularities and apparent inconsistencies with respect to static torsion characteristics S in a relatively wide region. In contrast to this, the dynamic torsional characteristics D1 in FIG. 4 are relatively consistent with respect to the static torsion characteristics S in a relatively wide region. The conventional method dynamic torsional characteristics D2 in FIG. 7 are less representative because the inertia of the input rotary member 101 acts to cancel the torque of the damper assembly 100 in the conventional measuring method shown in FIG. 6. The dynamic torsional characteristics D2 shown in FIG. 7 contain transient vibrations, and therefore lack precision. In contrast to this, the dynamic torsional characteristics D1 shown in FIG. 4 contain no transient vibration, and therefore have higher precision.

In the operation of measuring the dynamic torsional characteristics of the rotary damper assembly 10 by the measuring device of the embodiment, vibrating means V produces torque and vibrations (for instance, rapid variations in torque) as indicated by the arrow beside the first fixing portion 11 in FIG. 1A. Specifically, the vibrating means V applies vibrations of an appropriate predetermined frequency to the first fixing portion 11, as shown in FIG. 1A, causing rotary displacement of the first and second fixing portions 11 and 12. Measurements are recorded during the application of the vibrations by the apparatus described above to produce the results depicted in FIG. 4.

Figure 1B:
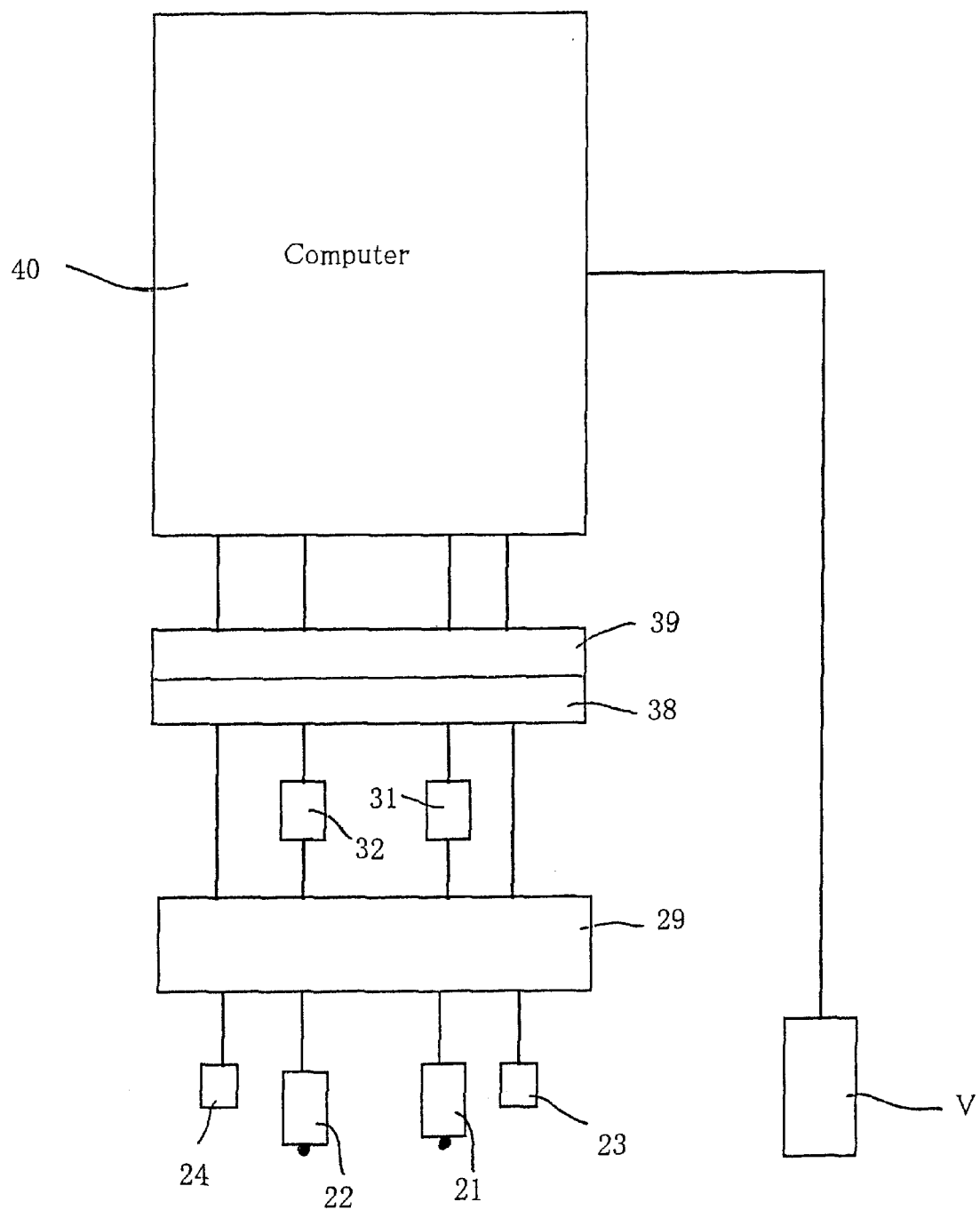
FIG. 1B is a schematic diagram showing the dynamic torsional characteristic measuring device in accordance with one embodiment of the present invention in an alternative configuration where a computer controls vibration input applied to a damper mechanism.

As is shown in FIG. 1B, the dynamic torsional characteristic measuring device may be configured such that the computer 40 is programed to control the vibrating means V thereby controlling the application of torque and vibrations on the damper assembly. However, the application of torque and vibrations may be independently controlled by, for instance, an operator manually changing torque applied by the vibrating means V.

The vibrating means V may be any of a variety of torque applying devices such as an electric motor, stepper motor, petroleum fuel powered motor or a manually operated lever configured for manual input of torque by an operator.

Second Embodiment

In the first embodiment described above, both the input and output rotary members 1 and 2 of the rotary damper assembly 10 are restrained for measuring the above described characteristics. However, the measurement can be performed in a state shown in FIG. 5 for determining the dynamic torsional characteristics in the state where a clutch is disengaged, i.e., where the output rotary member 2 can freely rotate.

Figure 5:
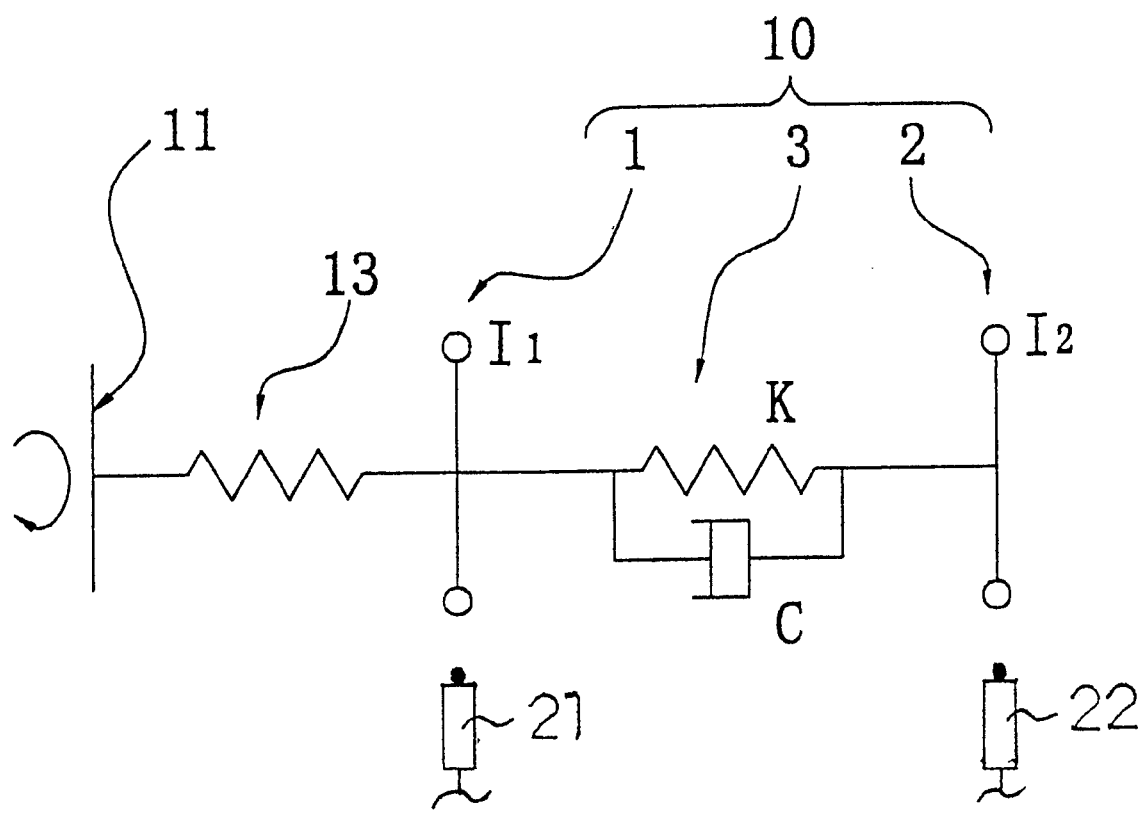
FIG. 5 is a schematic diagram showing elements of a rotary damper assembly in a restrained state in accordance with a second embodiment of the present invention.

The rotary damper assembly 10 shown in FIG. 5 has the input rotary member 1 fixed to the first fixing portion 11 via the first shaft 13 and the output rotary member 2 which is not restrained and can rotate freely.

In this embodiment, the torque of the first shaft 13 is not measured, and therefore processing by the calculating units 41, 42, 43 and 53 is not performed. Only the first and second pickups 21 and 22 take measurements for producing data. The data analyzing system, although not depicted in FIG. 5, includes generally the same components as the data analyzing system depicted in either of FIG. 1A or FIG. 1B, such as the data recorder 29, the rotation speed converters 31 and 32, the digital converter 38, the memory recorder 39 and the computer 40.

In the computer 40, the calculating unit 51 calculates the angular acceleration ($d^2\theta_2/dt^2$) of the output rotary member 2 by differentiating the angular speed ($d\theta_2/dt$) of the output rotary member 2 obtained from the rotation speed data of the output rotary member 2.

The calculating unit 52 multiplies the angular acceleration ($d^2\theta_2/dt^2$) of the output rotary member 2 by the moment of inertia ($I_2$) of the output rotary member 2. In this manner, the calculating unit 52 calculates the torque (T) of the rotary damper assembly 10 by the following formula:

$$T=(I_2)\times(d^2\theta_2/dt^2)$$

The calculating unit 45 obtains a difference between the angular speed ($d\theta_1/dt$) of the input rotary member 1 and the angular speed ($d\theta_2/dt$) of the output rotary member 2. The calculating unit 46 integrates the difference. Thereby, the relative torsion angle ($\theta$) of the rotary damper assembly 10 between the input and output rotary members 1 and 2 is calculated.

The dynamic torsional characteristics 49 of the rotary damper assembly 10 are obtained from the torque (T) of the rotary damper assembly 10 and the relative torsion angle ($\theta$) which are calculated as described above. Although the conventional method cannot perform the measurement without fixing the output rotary member 2, the measuring method of this embodiment can measure the dynamic torsional characteristics in the manner described above.

According to the second embodiment of the present invention, the torque (T) acting on the damper assembly can be accurately determined by removing the influence of the inertia of the input or output rotary member from the torque measured by the torque measuring sensor, and it is possible to determine the actual torsion angle ($\theta$) of the damper assembly which does no contain the torsion angle between the input/output rotary members and the restraining portions of the measuring device restraining the input/output rotary members. Accordingly, the dynamic torsional characteristics of the damper assembly can be accurately determined.

It should be understood that either embodiment of the present invention described above may be used to obtain data representing the dynamic torsional characteristics of any damper assembly. For instance, the damper assembly 10 in FIG. 1A can be a damper assembly in a clutch disc assembly with coil springs and friction washers. Alternatively, the damper mechanism may be in a flywheel assembly or torque convertor lockup clutch assembly with combinations of elastic elements and friction washers or viscous fluid retarding mechanisms.

It should further be understood that the computer 40 of the dynamic torsional characteristic measuring device of the present invention can be a personal computer having a CRT display, CPU, RAM and storage device such as a hard drive, that is programed perform the operations described above. Alternatively, the computer 40 may be a special circuit having the computational capabilities described above built into circuits therein.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. A measuring device for measuring dynamic torsional characteristics of a damper assembly having a damper mechanism operably disposed between input and output rotary members of the damper assembly, said measuring device comprising:

vibrating means for supplying a vibrating torque to the input rotary member of the damper assembly;

first angular speed measuring sensor for measuring an angular speed ($d\theta_1/dt$) of the input rotary member;

second angular speed measuring sensor for measuring an angular speed ($d\theta_2/dt$) of the output rotary member; and a calculating means configured to determine torque and angular displacement of the damper mechanism using measurements made by said first and second angular speed measuring sensors, said calculating means calculating a torsion angle ($\theta$) of the damper unit by integrating a difference between the angular speed ($d\theta_1/dt$) of the input rotary member and the angular speed ($d\theta_2/dt$) of the output rotary member.

2. A measuring device for measuring dynamic torsional characteristics of a damper assembly having a damper mechanism operably disposed between input and output rotary members of the damper assembly, said measuring device comprising:

vibrating means for supplying a vibrating torque to the input rotary member of the damper assembly;

first angular speed measuring sensor for measuring an angular speed ($d\theta_1/dt$) of the input rotary member;

second angular speed measuring sensor for measuring an angular speed ($d\theta_2/dt$) of the output rotary member;

a torque measuring sensor for measuring at least one of a torque ($T_1$) transmitted to the input rotary member and a torque ($T_2$) transmitted to the output rotary member; and a calculating means configured to determine torque and angular displacement of the damper mechanism using measurements made by said first and second angular speed measuring sensors, said calculating means including a first calculating unit for calculating a torsion angle ($\theta$) of the damper unit;

a second calculating unit for calculating a torque (T) acting on the damper unit; and a third calculating unit for calculating angular acceleration ($d^2\theta_1/dt^2$) of the input rotary member by differentiating the angular speed ($d\theta_1/dt$) of the input rotary member, calculations of said first and second calculating units being based on measurements from said first and second angular speed measuring sensors and said torque measuring sensor; and said first calculating unit calculating the torsion angle ($\theta$) of the damper unit by integrating a difference between the angular speed ($d\theta_1/dt$) of the input rotary member and the angular speed ($d\theta_2/dt$) of the output rotary member, and said second calculating unit calculating the torque (T) acting on the damper unit by subtracting from the torque ($T_1$) the product of a moment of inertia ($I_1$) of the input rotary member and the angular acceleration ($d^2\theta_1/dt^2$) of the input rotary member, as set forth by the equation:

$$\{T = T_1 - (I_1) \times (d^2\theta_1/dt^2)\}.$$

3. The measuring device as set forth in claim 2, wherein said torque measuring sensor comprises a strain gauge fixed to a torsion shaft configured to support and apply torque to one of the input rotary member and the output rotary member of the damper unit.

4. The measuring device as set forth in claim 2, wherein said torque measuring sensor comprises a magnetic pickup configured to sense motion of protrusions on an adjacent rotary member.

5. A measuring device for measuring dynamic torsional characteristics of a damper assembly having a damper mechanism operably disposed between input and output rotary members of the damper assembly, said measuring device comprising:

vibrating means for supplying a vibrating torque to the input rotary member of the damper assembly;

first angular speed measuring sensor for measuring an angular speed ($d\theta_1/dt$) of the input rotary member;

second angular speed measuring sensor for measuring an angular speed ($d\theta_2/dt$) of the output rotary member;

a torque measuring sensor for measuring at least one of a torque ($T_1$) transmitted to the input rotary member and a torque ($T_2$) transmitted to the output rotary member; and a calculating means configured to determine torque and angular displacement of the damper mechanism using measurements made by said first and second angular speed measuring sensors, said calculating means including a first calculating unit for calculating a torsion angle ($\theta$) of the damper unit;

a second calculating unit for calculating a torque (T) acting on the damper unit; and a third calculating unit for calculating angular acceleration ($d^2\theta_1/dt$) of the input rotary member by differentiating the angular speed ($d\theta_1/dt$) of the input rotary member, calculations of said first and second calculating units being based on measurements from said first and second angular speed measuring sensors and said torque measuring sensor; and said first calculating unit calculating the torsion angle ($\theta$) of the damper unit by integrating a difference between the angular speed ($d\theta_1/dt$) of the input rotary member and the angular speed ($d\theta_2/dt$) of the output rotary member, and said second calculating unit calculating the torque (T) acting on the damper unit by adding the torque ($T_2$) and the product of a moment of inertia ($I_2$) of the input rotary member and the angular acceleration ($d^2\theta_2/dt^2$) of the input rotary member, as set forth by the equation:

$$\{T = T_2 + (I_2) \times (d^2\theta_2/dt^2)\}.$$

6. The measuring device as set forth in claim 5, wherein said torque measuring sensor comprises a strain gauge fixed to a torsion shaft configured to support and apply torque to one of the input rotary member and the output rotary member of the damper unit.

7. The measuring device as set forth in claim 5, wherein said torque measuring sensor comprises a magnetic pickup configured to sense motion of protrusions on an adjacent rotary member.

8. A measuring device for measuring dynamic torsional characteristics of a damper assembly having a damper mechanism operably disposed between input and output rotary members of the damper assembly, said measuring device comprising:

vibrating means for supplying a vibrating torque to the input rotary member of the damper assembly;

first angular speed measuring sensor for measuring an angular speed ($d\theta_1/dt$) of the input rotary member;

second angular speed measuring sensor for measuring an angular speed ($d\theta_2/dt$) of the output rotary member; and a calculating means configured to determine torque and angular displacement of the damper mechanism using measurements made by said first and second angular speed measuring sensors, said measuring device being adapted to measure dynamic torsional characteristics of the damper unit with the output rotary member of the damper unit restrained against rotary movement.

9. A measuring device for measuring dynamic torsional characteristics of a damper assembly having a damper mechanism operably disposed between input and output rotary members, said measuring device comprising:

vibrating means for supplying a vibrating torque to the input rotary member;

first angular speed measuring sensor for measuring an angular speed ($d\theta_1/dt$) of the input rotary member;

second angular speed measuring sensor for measuring an angular speed ($d\theta_2/dt$) of the output rotary member;

torque measuring sensor for measuring at least one of a torque ($T_1$) transmitted to the input rotary member and a torque ($T_2$) transmitted to the output rotary member; and calculating means having first and second calculating units for calculating at least a torsion angle ($\theta$) of the damper unit and a torque (T) acting on the damper unit based on measured values of said first and second angular speed measuring sensor and said torque measuring sensor, wherein said first calculating unit of said calculating means calculates the torsion angle ($\theta$) of the damper unit by integrating a difference between the angular speed ($d\theta_1/dt$) of the input rotary member and the angular speed ($d\theta_2/dt$) of the output rotary member, and said second calculating unit of said calculating means calculates the torque (T) acting on the damper unit by subtracting from the torque ($T_1$) a moment of inertia ($I_1$) of the input rotary member multiplied by an angular acceleration ($d^2\theta_1/dt^2$) of the input rotary member, said angular acceleration being calculated by differentiating the angular speed ($d\theta_1/dt$) of the input rotary member, where said torque measuring sensor measures the torque ($T_1$) transmitted to the input rotary member, according to the equation:

$$\{T=T_1-(I_1)\times(d^2\theta_1/dt^2)\}$$

and calculating the torque (T) acting on the damper unit by adding to the torque ($T_2$) transmitted to the output rotary member a moment of inertia ($I_2$) of the output rotary member multiplied by an angular acceleration ($d^2\theta_2/dt^2$) of the output rotary member, said angular acceleration being calculated by differentiating the angular speed ($d\theta_2/dt$) of the output rotary member, where said torque measuring sensor measures the torque ($T_2$) transmitted to the output rotary member in accordance with the equation:

$$\{T=T_2+(I_2)\times(d^2\theta_2/dt^2)\}.$$

10. The measuring device as set forth in claim 9, wherein said measuring device is adapted to measure dynamic torsional characteristics of the damper unit with the output rotary member restrained against rotary movement.

11. A measuring device for measuring dynamic torsional characteristics of a damper assembly including a damper unit arranged between input and output rotary members, said measuring device adapted to measure while restraining movement of the input rotary member, said measuring device comprising:

vibrating means for supplying a vibrating torque to the input rotary member;

first angular speed measuring sensor for measuring an angular speed ($d\theta_1/dt$) of the input rotary member;

second angular speed measuring sensor for measuring an angular speed ($d\theta_2/dt$) of the output rotary member; and calculating means having first and second calculating units for calculating at least a torsion angle ($\theta$) of the damper unit and a torque (T) acting on the damper unit based on measured values of said first and second angular speed measuring sensor, said first calculating unit of said calculating means calculates the torsion angle ($\theta$) of the damper unit by integrating a difference between the angular speed ($d\theta_1/dt$) of the input rotary member and the angular speed ($d\theta_2/dt$) of the output rotary member, and said second calculating unit of said calculating means calculates the torque (T) acting on the damper unit by multiplying an angular acceleration ($d^2\theta_2/dt^2$) of the output rotary member by a moment of inertia ($I_2$) of the output rotary member according to the equation:

$$\{T=(I_2)\times(d^2\theta_2/dt^2)\}$$

said angular acceleration being calculated by differentiating the angular speed ($d\theta_2/dt$) of the output rotary member.

12. The measuring device as set forth in claim 11, wherein said torque measuring sensor comprises a strain gauge fixed to a torsion shaft configured to support and apply torque to one of the input rotary member and the output rotary member of the damper unit.

13. The measuring device as set forth in claim 11, wherein said torque measuring sensor comprises a magnetic pickup configured to sense motion of protrusions on an adjacent rotary member.

14. A measuring method for measuring dynamic torsional characteristics of a damper assembly including a damper unit arranged between input and output rotary members, said measuring method comprising:

providing a vibrating torque to the input rotary member;

measuring angular speed ($d\theta_1/dt$) of the input rotary member;

measuring angular speed ($d\theta_2/dt$) of the output rotary member;

measuring at least one of a torque ($T_1$) transmitted to the input rotary member and a torque ($T_2$) transmitted to the output rotary member;

calculating the torsion angle ($\theta$) of the damper unit by integrating a difference between the angular speed ($d\theta_1/dt$) of the input rotary member and the angular speed ($d\theta_2/dt$) of the output rotary member; and calculating step of calculating the torque (T) acting on the damper unit by at least one of two methods, the first method being: subtracting from the torque ($T_1$) a moment of inertia ($I_1$) of the input rotary member multiplied by an angular acceleration ($d^2\theta_1/dt^2$) of the input rotary member according to the equation:

$$\{T=T_1-(I_1)\times(d^2\theta_1/dt^2)\}$$

the angular acceleration being calculated by differentiating the angular speed ($d\theta_1/dt$) of the input rotary member in response to measuring the torque ($T_1$) being measured in said torque measuring step, and the second method being: adding to the torque ($T_2$) a moment of inertia ($I_2$) of the output rotary member multiplied by an angular acceleration ($d^2\theta_2/dt^2$) of the output rotary member according to the equation:

$$\{T=T_2+(I_2)\times(d^2\theta_2/dt^2)\}$$

the angular acceleration being calculated by differentiating the angular speed ($d\theta_2/dt$) of the output rotary member, in response to measuring the torque ($T_2$).

15. A measuring method for measuring dynamic torsional characteristics of a damper assembly including a damper unit arranged between input and output rotary members, comprising:

providing a vibrating torque to the input rotary member;

measuring angular speed ($d\theta_1/dt$) of the input rotary member;

measuring angular speed ($d\theta_2/dt$) of the output rotary member;

calculating torsion angle ($\theta$) of the damper unit by integrating a difference between the angular speed ($d\theta_1/dt$) of the input rotary member and the angular speed ($d\theta_2/dt$) of the output rotary member; and calculating torque (T) acting on the damper unit by multiplying an angular acceleration ($d^2\theta_2/dt^2$) of the output rotary member by a moment of inertia ($I_2$) of the output rotary member according to the equation:

$$\{T=(I_2)\times(d^2\theta_2/dt^2)\}$$

said angular acceleration being calculated by differentiating the angular speed ($d\theta_2/dt$) of the output rotary member.

16. A measuring device for measuring dynamic torsional characteristics of a damper assembly having a damper mechanism operably disposed between input and output rotary members of the damper assembly, said measuring device comprising:

vibrating means for supplying a vibrating torque to the input rotary member of the damper assembly;

first angular speed measuring sensor for measuring an angular speed ($d\theta_1/dt$) of the input rotary member;

second angular speed measuring sensor for measuring an angular speed ($d\theta_2/dt$) of the output rotary member; and a calculating means configured to determine torque and angular displacement of the damper mechanism using measurements made by said first and second angular speed measuring sensors, said calculating means calculating the torque acting on the damper unit by multiplying an angular acceleration ($d^2\theta_2/dt^2$) of the output rotary member by a moment of inertia ($I_2$) of the output rotary member according to the equation:

$$\{T=(I_2)\times(d^2\theta_2/dt^2)\}$$

said angular acceleration being calculated by differentiating the angular speed ($d\theta_2/dt$) of the output rotary member.

* * * * *